(12) United States Patent
Gehring et al.

(10) Patent No.: US 6,502,731 B1
(45) Date of Patent: Jan. 7, 2003

(54) SHOPPING BAG HOLDERS FOR VEHICLES

(75) Inventors: Thomas F. J. Gehring, Ontario (CA); Ireneusz Jankowski, Ontario (CA); Dejan Havidic, Toronto (CA); Duane Poliquin, Brighton, MI (US)

(73) Assignee: Collins & Aikman Products Co., Troy, MI (US)

( * ) Notice: Subject to any disclaimer, the term of this patent is extended or adjusted under 35 U.S.C. 154(b) by 0 days.

(21) Appl. No.: 09/922,145

(22) Filed: Aug. 3, 2001

(51) Int. Cl.$^7$ ................................................. B60R 7/00
(52) U.S. Cl. ........................ 224/553; 224/282; 224/311; 224/564; 224/925; 224/926; 296/37.1; D6/513; D6/567
(58) Field of Search ................................. 224/282, 309, 224/311, 539, 548, 549, 553, 564, 566, 925, 926; 211/106.1; 248/202.1; 296/37.1; D6/513, 553, 567

(56) References Cited

U.S. PATENT DOCUMENTS

| | | | |
|---|---|---|---|
| 3,261,521 A | * 7/1966 | Meccico et al. | ............... 211/64 |
| 4,029,244 A | 6/1977 | Roberts | |
| 4,226,348 A | 10/1980 | Dottor et al. | |
| 4,540,213 A | 9/1985 | Herlitz et al. | |
| 4,623,111 A | 11/1986 | Prader | |
| 4,671,556 A | * 6/1987 | Lynas, III | ................... 211/123 |
| 4,684,087 A | 8/1987 | Spickard | |
| 4,718,584 A | 1/1988 | Schoeny | |
| 4,930,734 A | 6/1990 | Schmidt | |
| 4,998,694 A | 3/1991 | Barteaux | |
| 5,129,612 A | 7/1992 | Beaupre | |
| 5,137,158 A | * 8/1992 | Brockway | ............. 211/106.01 |
| 5,161,700 A | 11/1992 | Stannis et al. | |
| 5,190,253 A | 3/1993 | Sable | |
| 5,287,971 A | * 2/1994 | Dorman | ........................ 211/12 |
| D353,291 S | * 12/1994 | Mercer | ......................... D6/513 |
| 5,427,288 A | * 6/1995 | Trubee | ......................... 224/539 |
| 5,458,301 A | 10/1995 | Cournoyer | |
| 5,484,091 A | 1/1996 | Malinowski et al. | |
| 5,685,592 A | * 11/1997 | Heinz | .......................... 224/925 |
| 5,762,245 A | * 6/1998 | Hurst | ............................ 108/44 |
| 5,769,294 A | * 6/1998 | Heinz et al. | ................. 224/544 |
| 5,829,813 A | * 11/1998 | LaValle | ........................ 224/311 |
| 5,845,951 A | 12/1998 | Webb | |
| 6,062,452 A | * 5/2000 | Kauskey | ...................... 224/402 |
| 6,092,704 A | * 7/2000 | Baumeister | ................. 224/275 |
| 6,155,521 A | 12/2000 | O'Hanlon | |

* cited by examiner

Primary Examiner—Stephen K. Cronin
(74) Attorney, Agent, or Firm—Myers Bigel Sibley & Sajovec (57) ABSTRACT

Apparatus for supporting loaded shopping bags within a compartment of a vehicle, such as an automobile trunk, so that the bags are maintained in an upright position during vehicle operation are provided. An apparatus includes a frame that is movably secured beneath a panel, such as an automobile package tray, that is in overlying, spaced-apart relationship with a floor of a vehicle compartment. The frame is movable between a stored position and an extended position. The frame is disposed beneath the panel when in the stored position, and the frame extends outwardly from the panel into the vehicle compartment for convenient use thereof by a user when in the extended position. One or more projections extend from the frame, such as from a free edge portion thereof. Each projection is configured to support one or more loaded shopping bags by the handles thereof and to maintain the one or more loaded shopping bags in an upright position during operation of the vehicle.

65 Claims, 12 Drawing Sheets

SHOPPING BAG HOLDERS FOR VEHICLES

FIELD OF THE INVENTION

The present invention is related, in general, to the field of bag holders and, in particular, to devices designed for holding bags having handles when such bags, filled with groceries or other items, are being transported in vehicles.

BACKGROUND OF THE INVENTION

Figure 1:
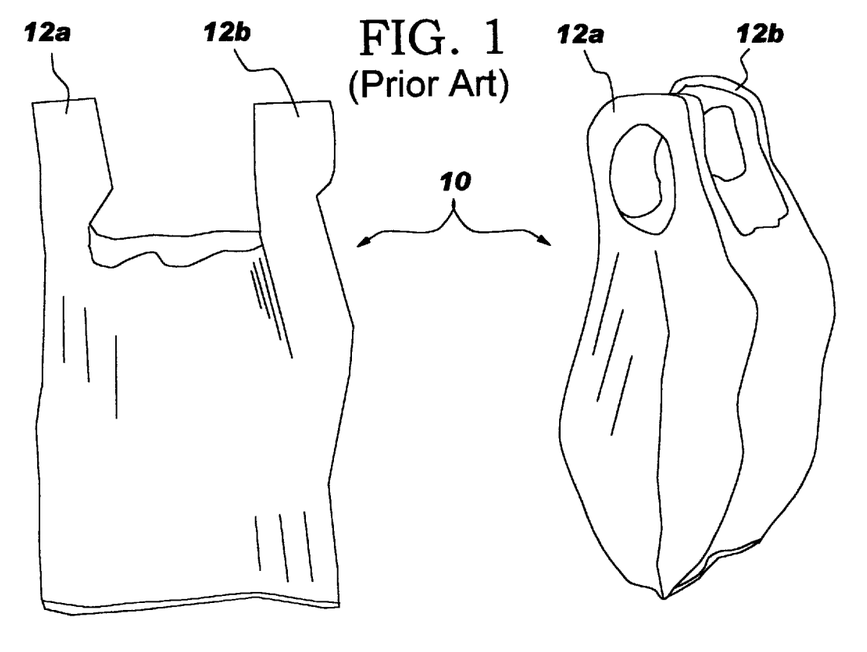
FIG. 1 illustrates a conventional T-shirt style plastic shopping bag.

Plastic "T-shirt" style shopping bags are increasingly being utilized by consumers to transport purchased items, such as groceries. As illustrated in FIG. 1, conventional T-shirt style bags 10 are made of a thin plastic material with cutouts at the open end to form two handles 12a, 12b for carrying the bag. Unlike a box or other container with rigid confines, T-shirt style shopping bags may not have the ability to maintain any shape apart from the shape of whatever items the bag may be enveloping and may be unable to prevent items therewithin from causing the shape and position of the bag to shift.

While T-shirt style shopping bags may be convenient for personal carrying, because their handles are readily accessible and a plurality of bags can be gripped for carrying, they may be relatively inconvenient when placed within a vehicle. During vehicle operation, items within T-shirt style shopping bags may tend to move, roll about, shift position and fall out as a vehicle moves and turns.

SUMMARY OF THE INVENTION

In view of the above discussion, an apparatus for supporting loaded T-shirt style shopping bags within a compartment of a vehicle, such as an automobile trunk, so that the bags are maintained in an upright position during vehicle operation is provided. Herewithin, the term "shopping bag" is intended to include all types of bags having handles extending from portions thereof (e.g., T-shirt style bags, etc.). According to an embodiment of the present invention, an apparatus includes a frame that is movably secured beneath a panel, such as an automobile package tray, that is in overlying, spaced-apart relationship with a floor (or other surface) of a vehicle compartment. The frame is movable (e.g., pivotally movable, slidably movable, etc.) between a stored position and an extended position. The frame is disposed beneath the panel when in the stored position, and the frame extends outwardly from the panel into the vehicle compartment for convenient use thereof by a user when in the extended position. One or more projections (e.g., hooks) extend from the frame, such as from a free edge portion thereof. Each projection is configured to support one or more loaded shopping bags by the handles thereof and to maintain the one or more loaded shopping bags in an upright position during operation of the vehicle.

According to other embodiments of the present invention, one or more biasing members, such as springs, may be attached to the frame and to another portion of a vehicle for the purpose of urging the frame from the extended position to the stored position.

According to other embodiments of the present invention, the frame may include one or more compartments that are configured to receive articles for storage therein. A cover member may be provided that is movably supported on the frame and that is configured to cover the one or more compartments.

According to other embodiments of the present invention, the frame may include one or more cup holders.

According to other embodiments of the present invention, a finishing member may be provided within a vehicle compartment that is configured to receive the frame projections in mating engagement therewith when the frame is in a stored position.

According to other embodiments of the present invention, the frame projections may be movably secured to the frame so as to be movable from a non-operative position to an operative position. For example, when the frame is in a stored position, the projections may be in a non-operative position. Once the frame is moved to an extended position, the projections may be moved to an operative position whereby they are configured to support one or more loaded shopping bags by the handles thereof.

Apparatus for supporting loaded shopping bags within vehicles according to embodiments of the present invention may prevent the supported bags from shifting about and spilling their contents during movement of a vehicle. In addition, apparatus for supporting loaded shopping bags within vehicles according to embodiments of the present invention may be advantageous over conventional bag holding devices because they may be inexpensive to manufacture and install compared with conventional bag holding devices. Moreover, apparatus according to embodiments of the present invention are configured to be stored out of the way when not in use.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 2:
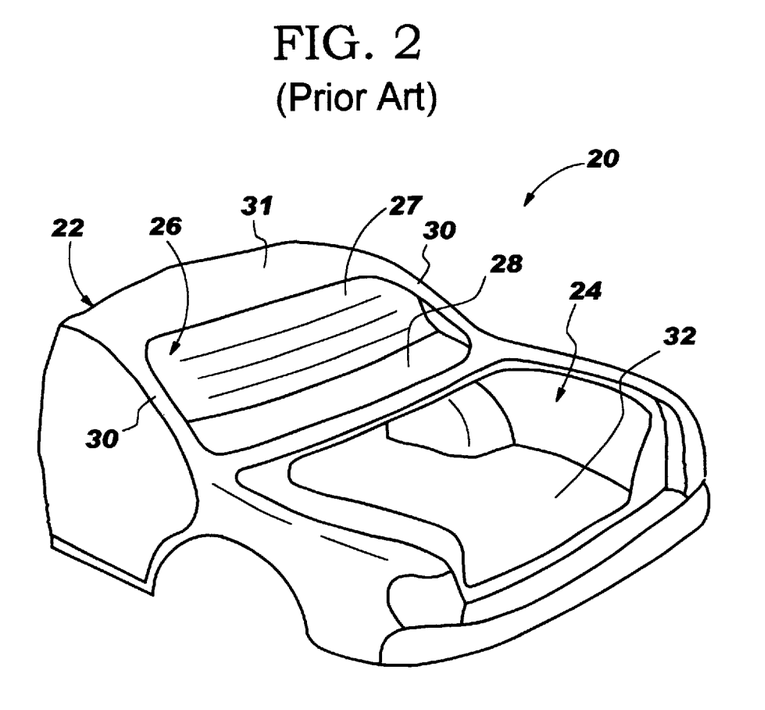
FIG. 2 is a perspective view of a rearward portion of an automobile having a trunk.

FIG. 2 is a perspective view of a rearward portion 22 of an automobile 20 that encloses a cargo compartment (trunk) 24. As would be understood by those skilled in the art, the trunk 24 is separated from the passenger compartment 26 of the automobile by a package tray 28 and the seat back of a rear seat (not shown). The illustrated package tray 28 is disposed inside the passenger compartment 26 below a rear windshield 27, and extends transversely between rear pillars 30 which support a roof 31. The package tray 28 overlies a portion of the floor 32 of the trunk 24 in spaced-apart relationship therewith, as illustrated. As would be understood by those skilled in the art, package trays typically are sufficiently rigid and strong to support small articles placed thereon.

Figure 3:
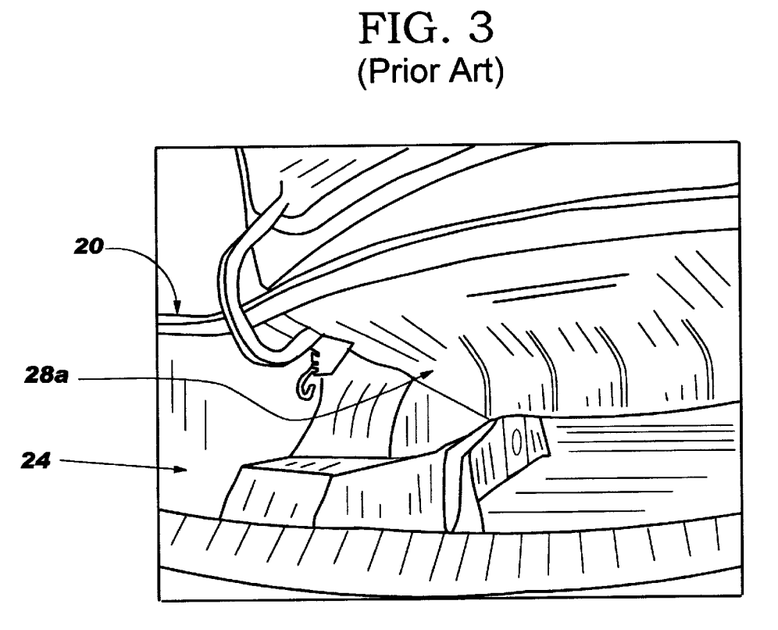
FIG. 3 is a perspective view of a portion of a trunk of an automobile including the underside portion of a package tray that separates the trunk from the passenger compartment of the automobile.

FIG. 3 is a perspective view of a portion of a trunk 24 of an automobile 20 that illustrates the underside portion 28a of a package tray. Apparatus for supporting loaded shopping bags according to embodiments of the present invention are configured to be mounted beneath and/or adjacent package trays of automobiles (as well as other panels and/or walls), as will be described below.

Figure 4A:
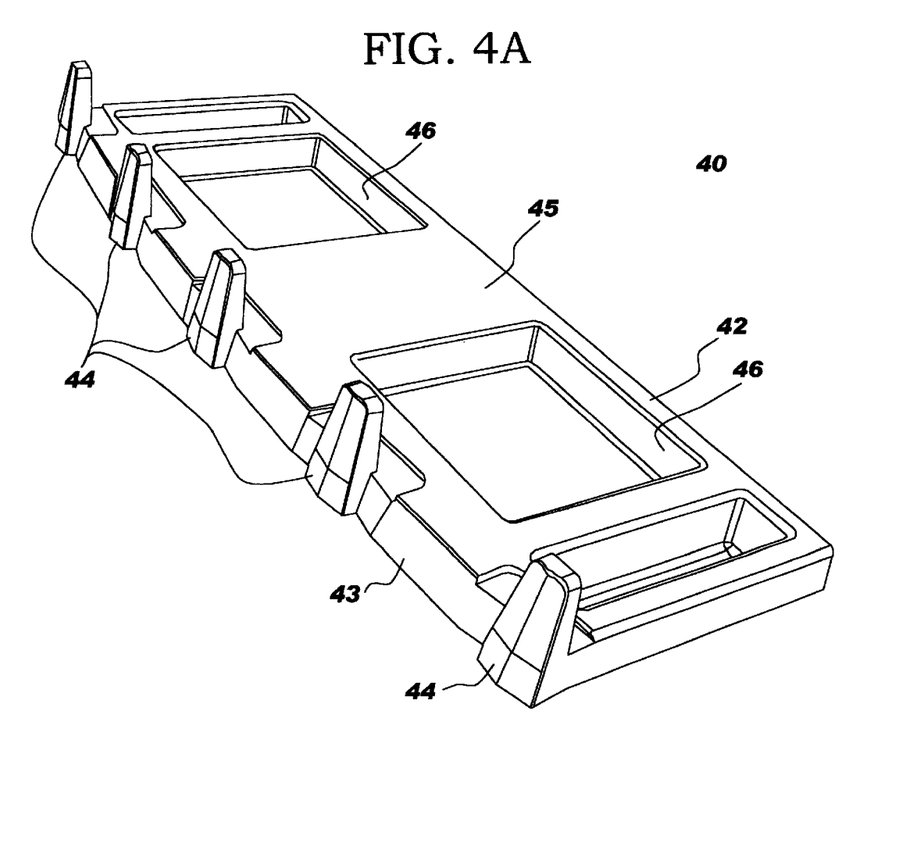
FIGS. 4A–4D are perspective views of various embodiments of apparatus for supporting loaded shopping bags within a compartment of a vehicle, according to the present invention.

Referring now to FIG. 4A, an apparatus 40 for supporting loaded shopping bags within a compartment of a vehicle (e.g., a trunk of an automobile) so that the bags are maintained in an upright position, according to an embodiment of the present invention, is illustrated. The illustrated apparatus 40 includes a frame 42 having a free edge portion 43 and a plurality of projections (e.g., hooks) 44 extending from the frame free edge portion 43 in adjacent, spaced-apart relationship. Each projection 44 is configured to support one or more loaded shopping bags by the handles thereof and to maintain the one or more loaded shopping bags in an upright position during operation of a vehicle in which the apparatus 40 is mounted. The illustrated frame 42 has a generally rectangular configuration and includes a surface 45 with a plurality of compartments 46 formed therein. The compartments 46 may be utilized to store various items therein.

Figure 4B:
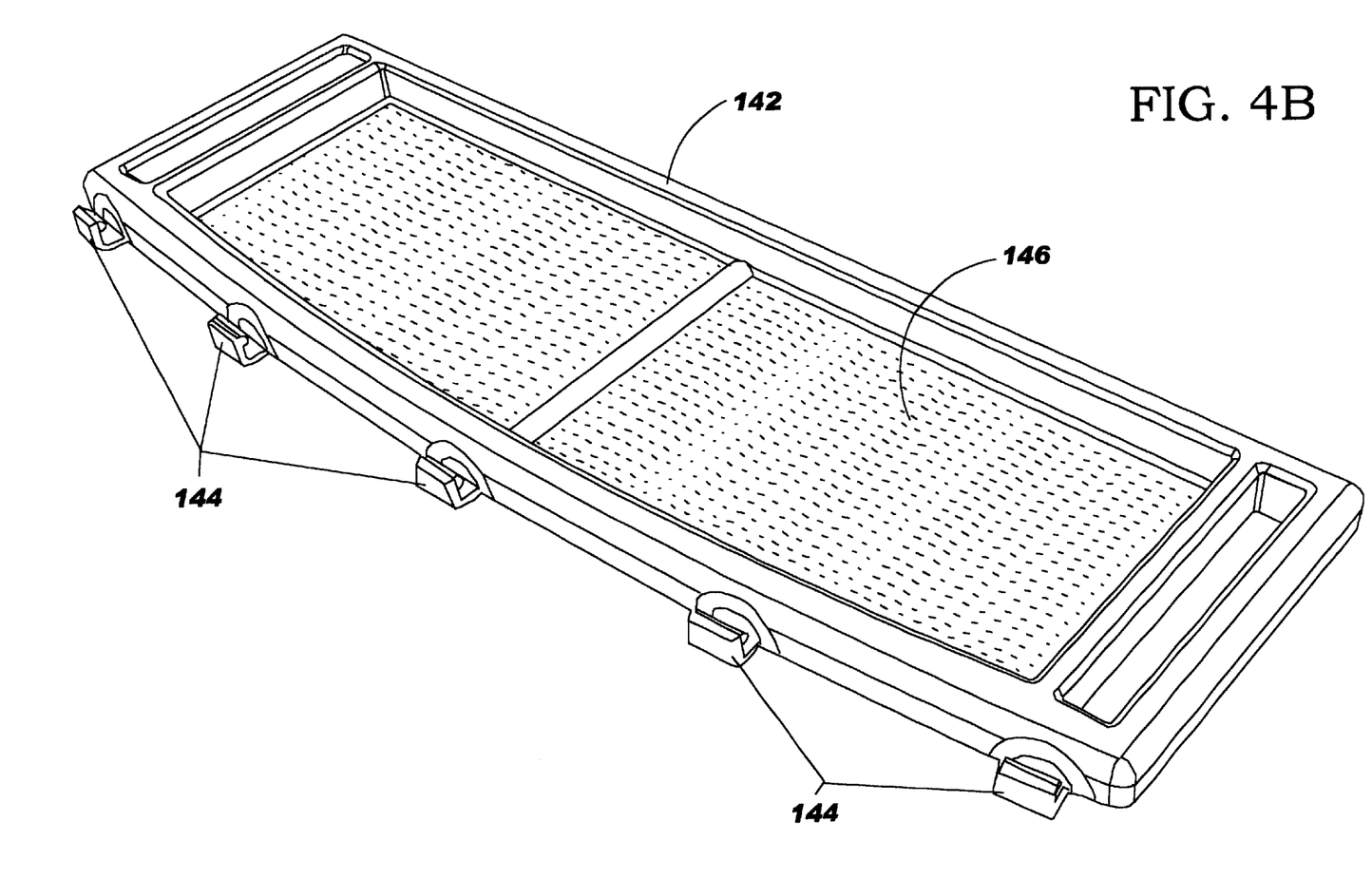
Figure 4C:
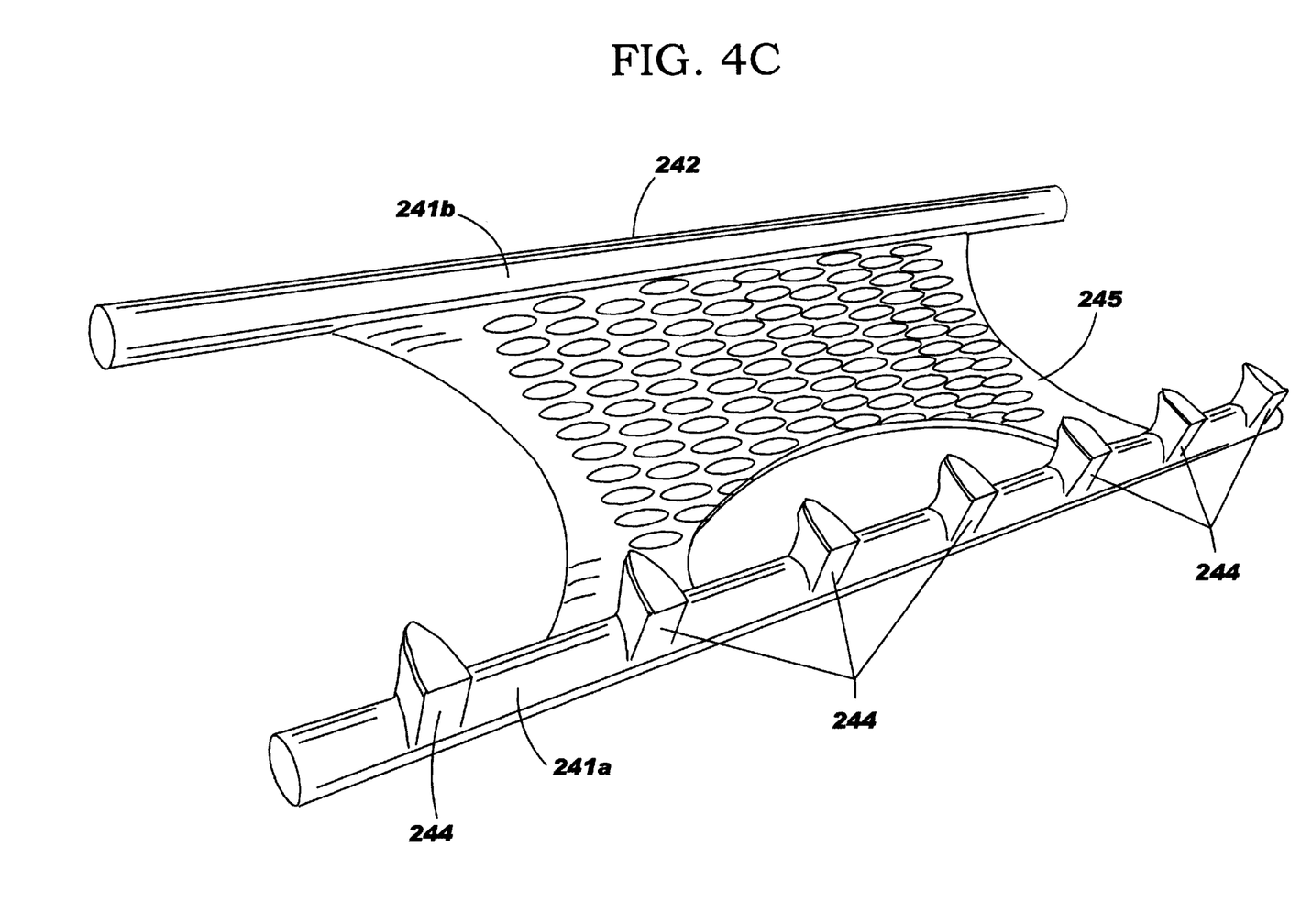
Figure 4D:
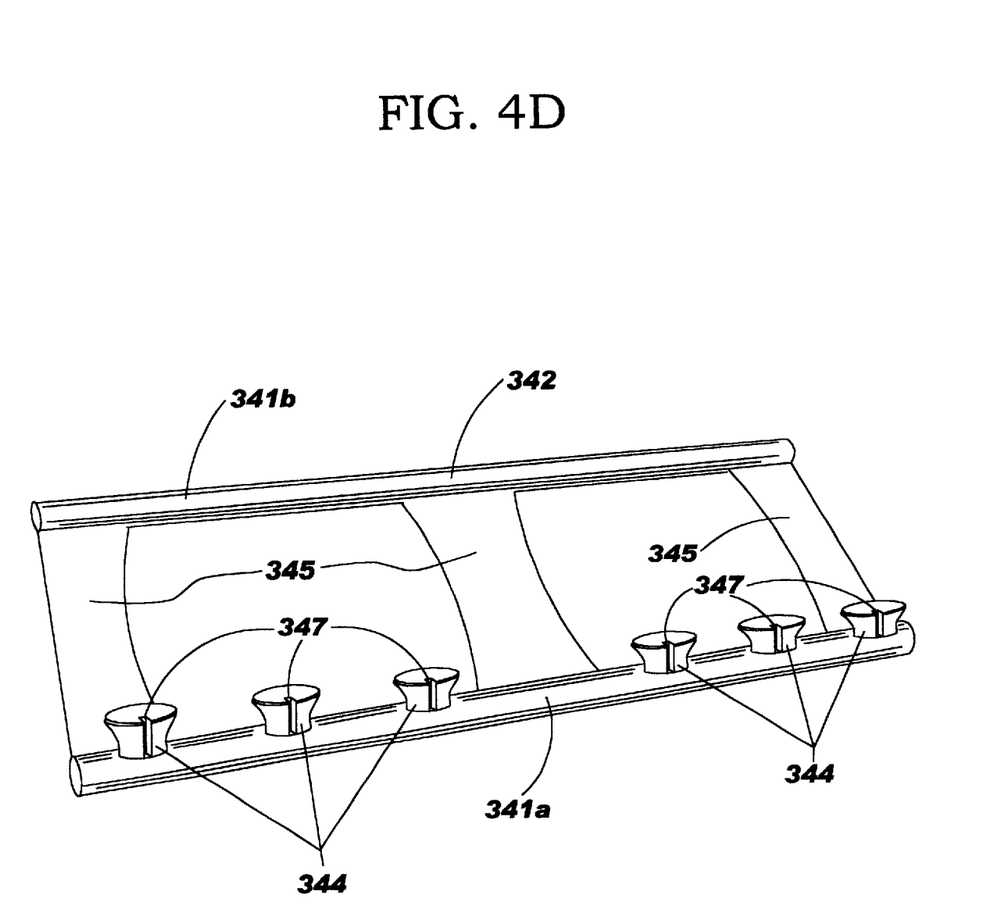

FIGS. 4B–4D illustrate various alternative embodiments of an apparatus for supporting loaded shopping bags within a compartment of a vehicle. In FIG. 4B, the illustrated frame 142 includes an elongated compartment 146 and the projections 144 have a lower profile than the projections 44 illustrated in FIG. 4A. In FIG. 4C, the illustrated frame 242 includes a pair of spaced-apart members 241a, 241b joined by a cross-member 245. A plurality of projections 244 extend from member 241a as illustrated. In FIG. 4D, the illustrated frame 342 includes a pair of spaced-apart members 341a, 341b joined by cross-members 345. A plurality of projections 344 extend from member 341a as illustrated.

The illustrated projections 344 include a slot 347 formed along a medial portion thereof.

It is understood that the present invention is not limited to the illustrated configurations of frames 42, 142, 242, 342 of FIGS. 4A–4D. Frames for apparatus according to embodiments of the present invention may have various configurations, shapes and sizes without limitation. In addition, frames for apparatus according to embodiments of the present invention may be formed from various types of materials. Exemplary materials include, but are not limited to, polymeric materials, wood materials, metallic materials, etc., and combinations thereof. In addition, the projections (e.g., 44, 144, 244, 344) for supporting shopping bags may be movable. For example, the projections may rotated (or otherwise moved) by a user into position when a frame is moved into an extended position.

Figure 5:
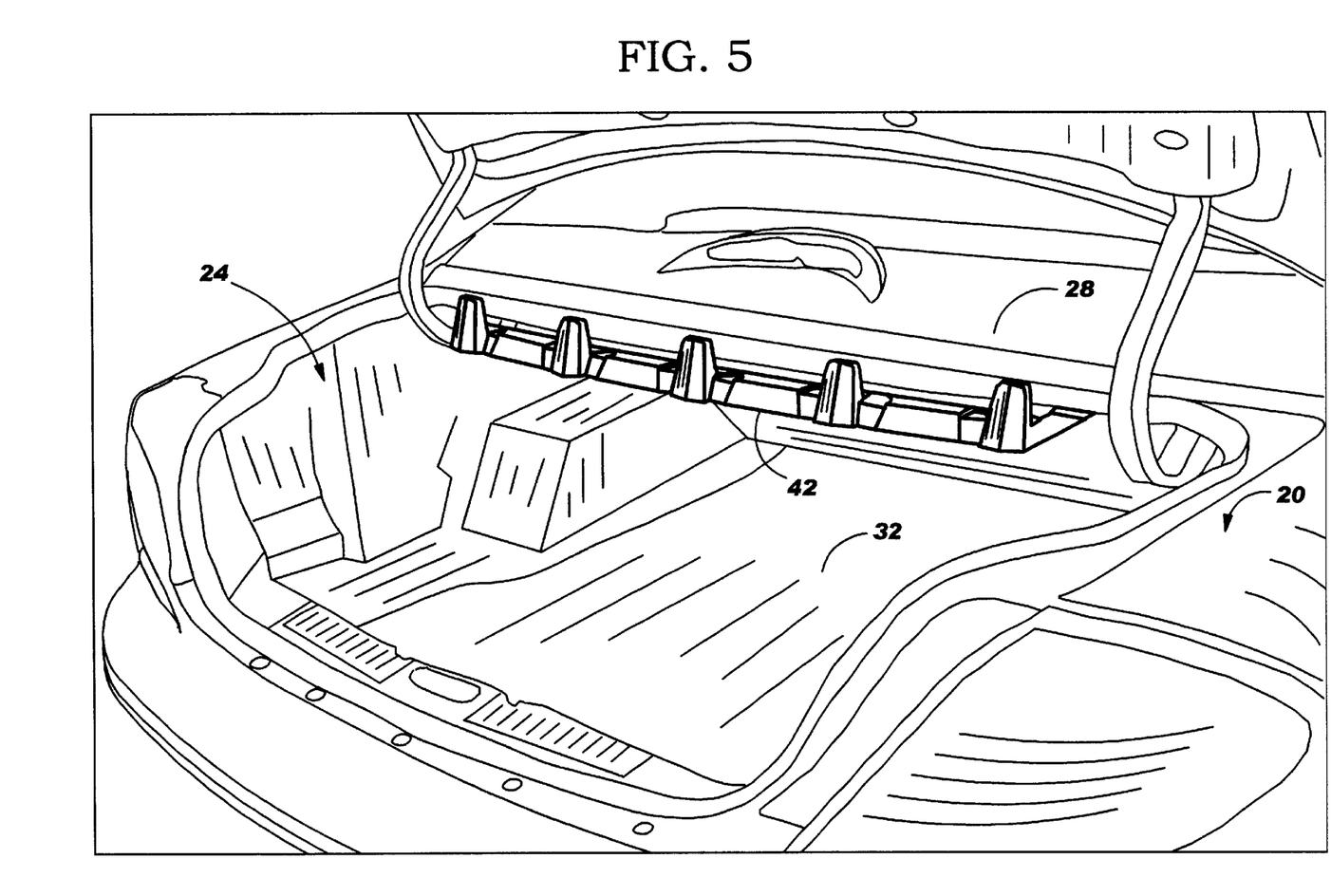
FIG. 5 is a perspective view of an automobile trunk within which an apparatus for supporting loaded shopping bags according to embodiments of the present invention is mounted and wherein the frame is in a stored position.
Figure 6:
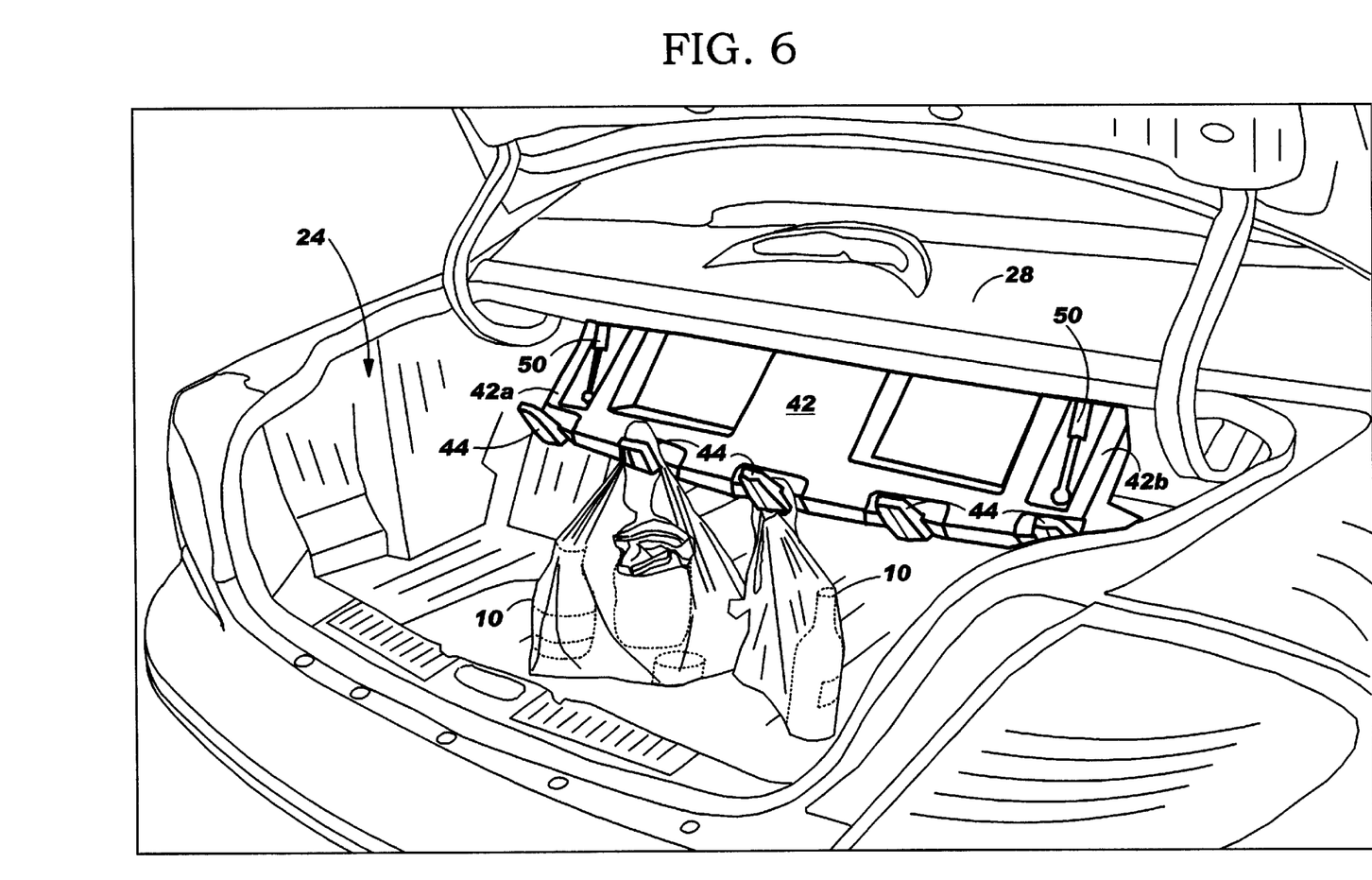
FIG. 6 is a perspective view of the apparatus of FIG. 5 wherein the frame is in an operative position and wherein loaded shopping bags are suspended from various ones of the projections on the frame.

Referring now to FIGS. 5–6, installation and operation of an apparatus according to embodiments of the present invention within the trunk 24 of an automobile 20 will now be described. In the illustrated embodiment, a frame 42 is movably secured beneath a package tray 28 that overlies and is in spaced-apart relationship with a floor 32 of the trunk 24. The frame 42 is movable between a stored position (FIG. 5) and an extended position (FIG. 6). As illustrated, the frame 42 is disposed beneath the package tray 28 when in the stored position (FIG. 5), and the frame 42 extends outwardly from the package tray 28 into the trunk 24 for convenient use thereof by a user when in the extended position (FIG. 6).

A pair of biasing members 50 are connected to opposite end portions 42a, 42b of the frame 42 and are configured to urge the frame 42 from the extended position to the stored position. The weight from loaded shopping bags suspended from one or more of the projections 44 helps maintain the frame 42 in the extended position. When the bags are removed, the biasing members 50 return the frame 42 to the stored position. Alternatively, the frame 42 may be moved manually by a user between stored and extended positions. It is understood that springs and other biasing members are not required.

Figure 7:
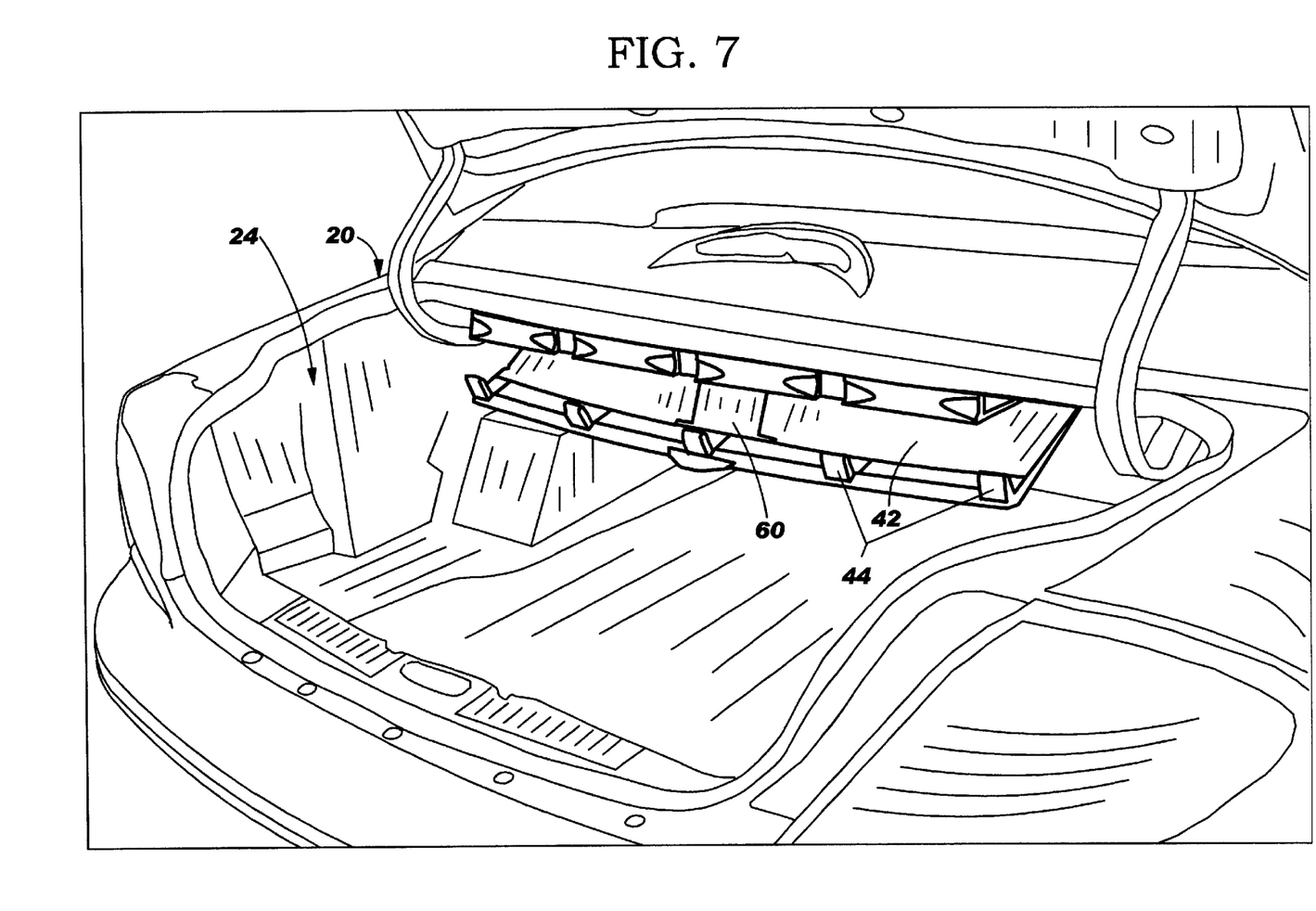
FIG. 7 is a perspective view of an automobile trunk within which an apparatus for supporting loaded shopping bags according to embodiments of the present invention is mounted and wherein the frame is supported by a central support.

Referring to FIG. 7, a central support 60 that allows a frame 42 to move between stored and extended positions, according to alternative embodiments of the present invention, is illustrated. The illustrated central support 60 may also include a biasing member, such as a spring, for urging the frame 42 from an extended position to a stored position. It is understood that support members of various configurations, sizes and numbers may be utilized in accordance with the present invention.

Figure 8:
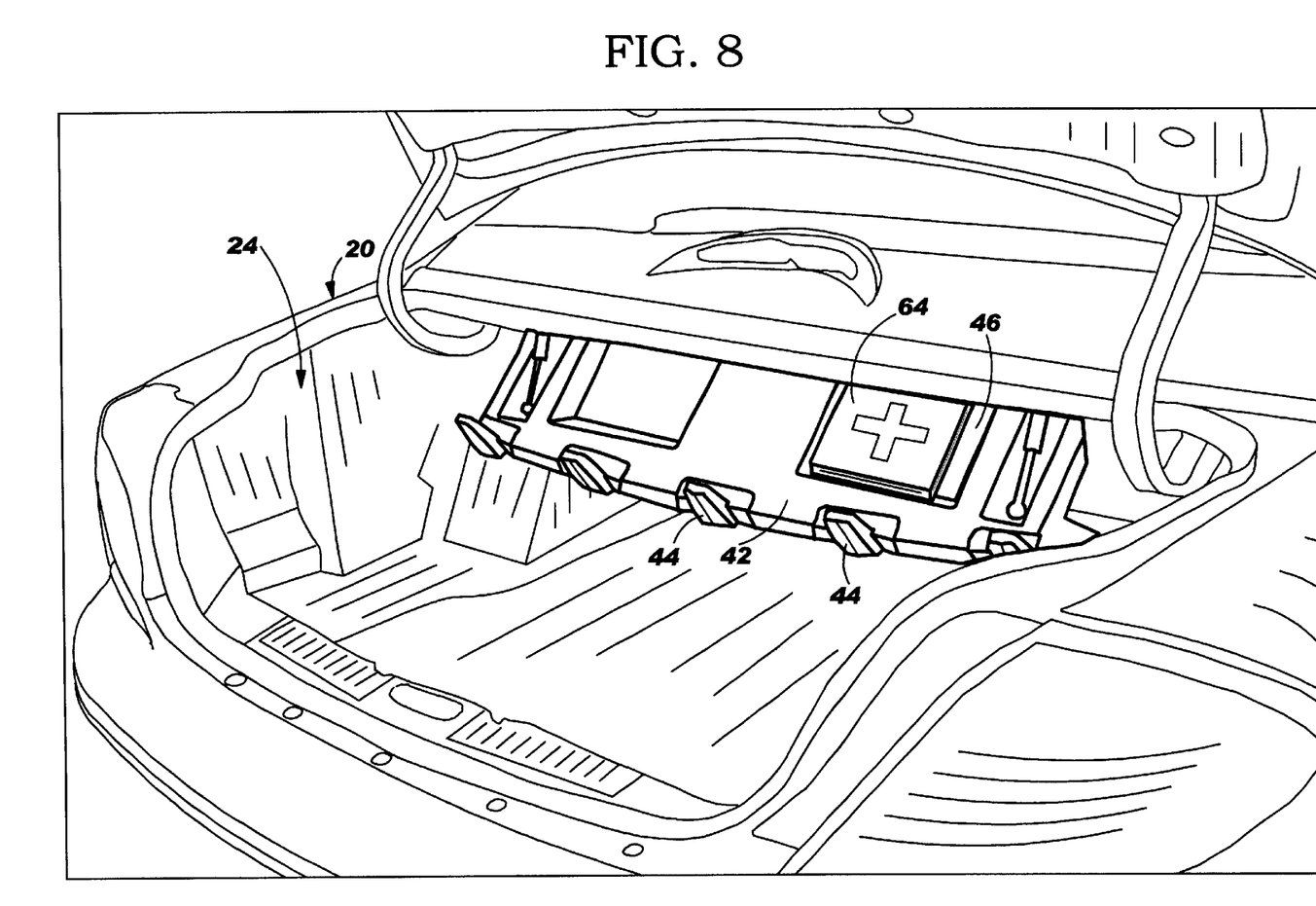
FIG. 8 is a perspective view of the frame of the apparatus of FIGS. 5–6 illustrating an article stored within a compartment formed in the frame.

Referring to FIG. 8, an article 64 is stored within one of the compartments 46 of frame 42.

Figure 9:
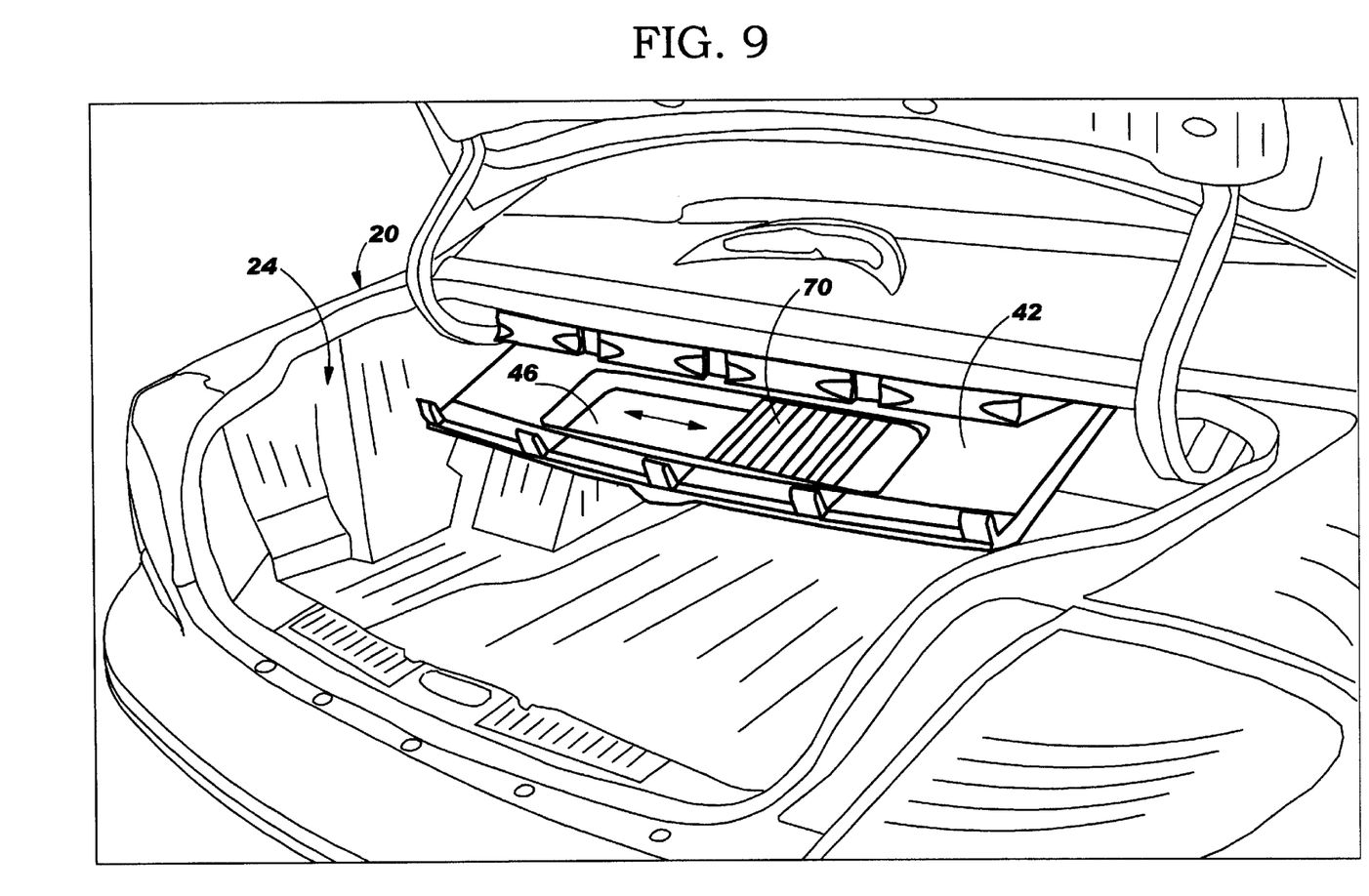
FIG. 9 is a perspective view of a frame according to embodiments of the present invention, wherein the frame includes a compartment and a cover slidably secured to the frame and configured to overlie the compartment.

Referring to FIG. 9, the frame 42 includes a cover member 70 that is movably supported on the frame 42. The illustrated cover member 70 is slidably supported on the frame 42 and is and configured to cover the compartment 46 and items stored therewithin.

Figure 10:
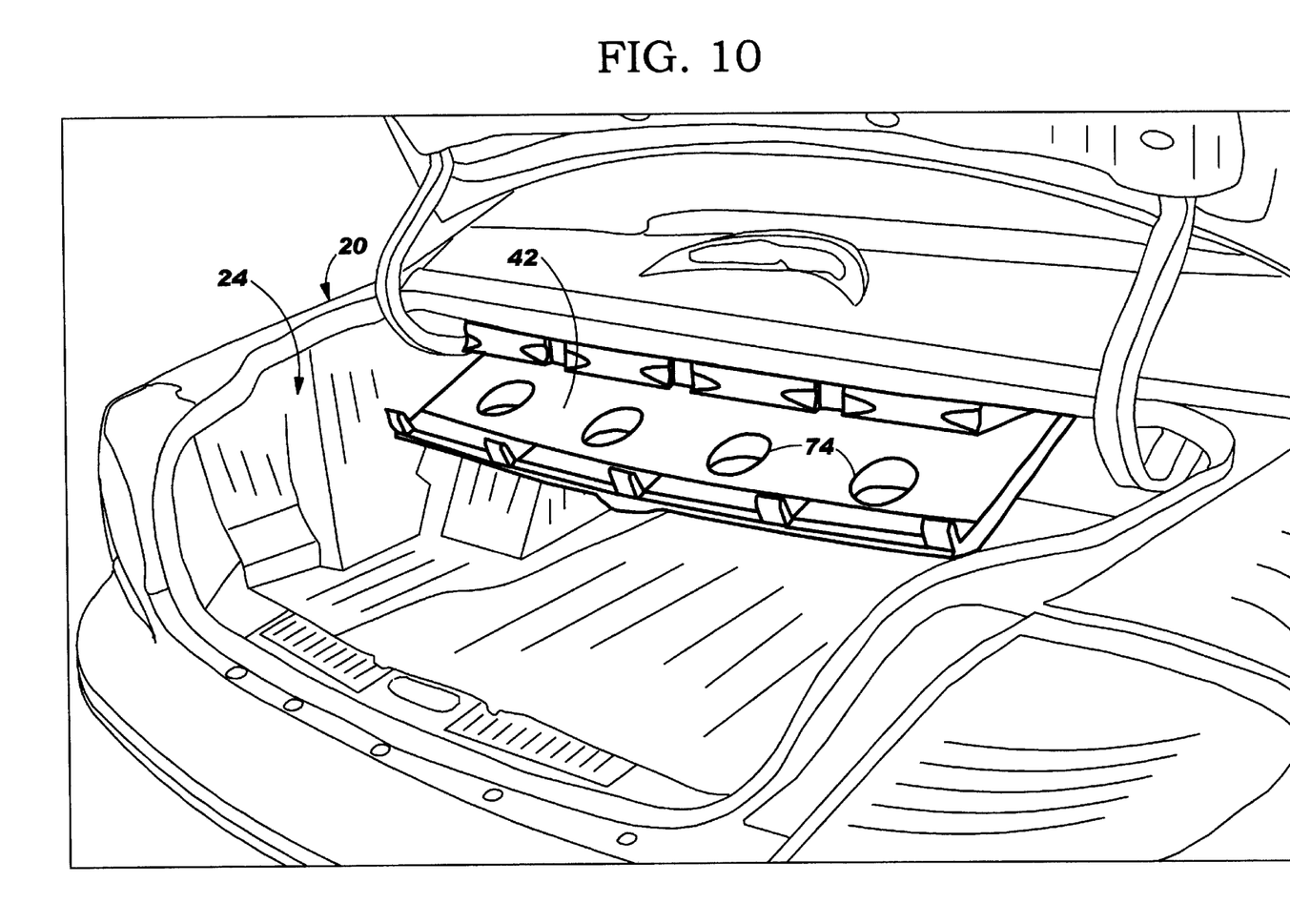
FIG. 10 is a perspective view of a frame according to embodiments of the present invention, wherein the frame includes a plurality of cup holders.

Referring to FIG. 10, the illustrated frame 42 includes a plurality of cup holders 74 in adjacent, spaced-apart relationship.

Figure 11:
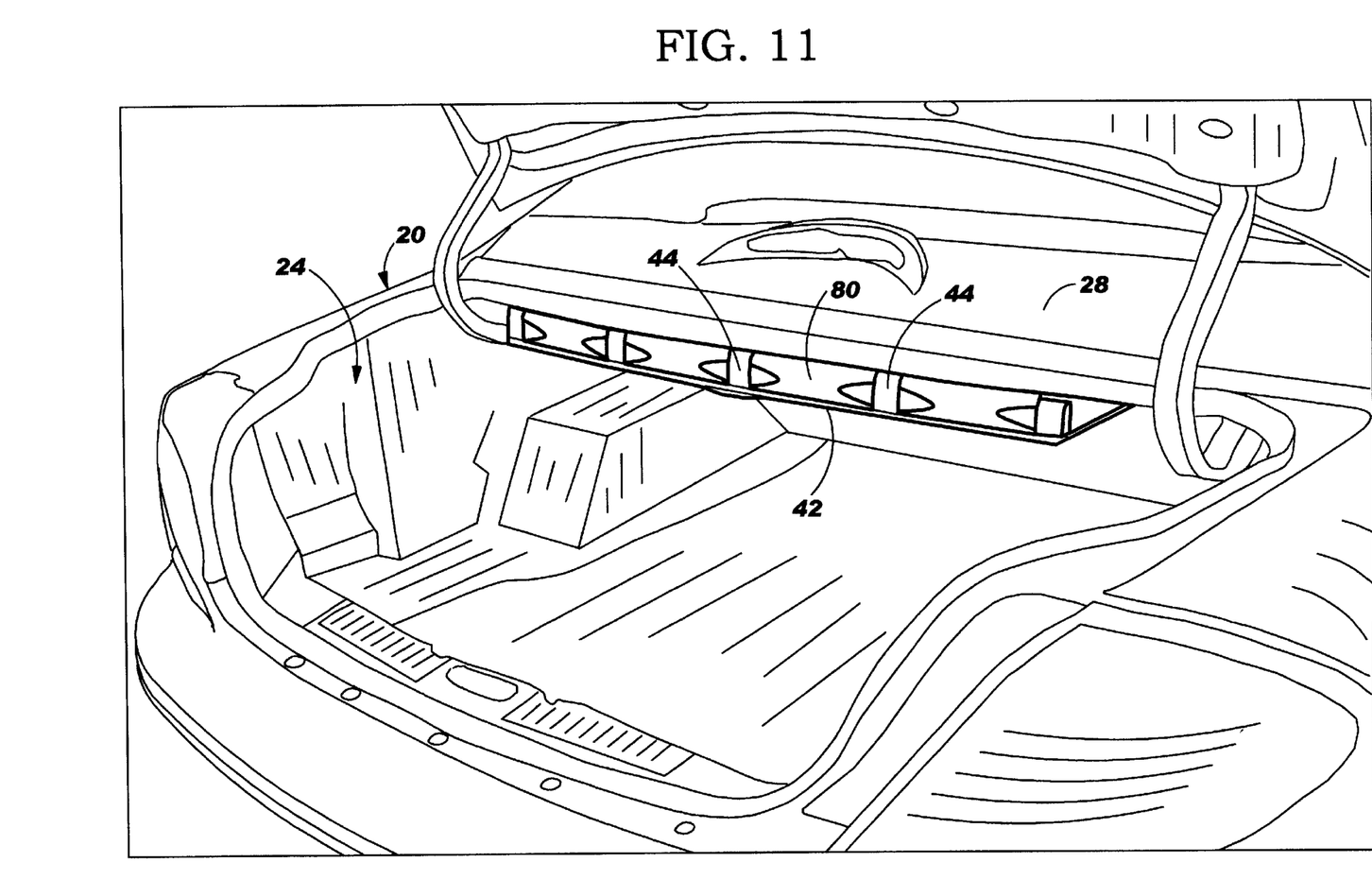
FIG. 11 is a perspective view of an automobile trunk within which an apparatus for supporting loaded shopping bags according to embodiments of the present invention is mounted and wherein a finishing member is mounted within the trunk and configured to receive the projections of a frame in mating engagement therewith when the frame is in the stored position.

Referring to FIG. 11, a finishing member 80 is secured beneath the package tray 28 and is configured to receive the projections 44 of frame 42 in mating engagement therewith when the frame 42 is in the stored position.

Although embodiments of the present invention have been described and illustrated with respect to installation within the trunk of an automobile, it is understood that apparatus according to the present invention can be installed in other compartments of vehicles.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An apparatus for supporting loaded shopping bags within a compartment of a vehicle so that the bags are maintained in an upright position, each bag having a pair of handle loops extending upwardly from opposite sides of the bag, wherein the vehicle compartment includes a floor, wherein a panel is in overlying, spaced-apart relationship with the compartment floor, the apparatus comprising:
   a frame movably secured beneath the panel and movable between a stored position and an extended position, wherein the frame is disposed beneath the panel when in the stored position, wherein the frame extends outwardly from the panel into the vehicle compartment for convenient use thereof by a user when the frame is in the extended position, and wherein the frame comprises a compartment that is configured to receive articles for storage therein;
   a cover member movably supported on the frame and configured to cover the compartment when in a closed position; and
   at least one projection extending from the frame that is configured to support one or more loaded shopping bags by the handles thereof and to maintain the one or more loaded shopping bags in an upright position during operation of the vehicle.

2. The apparatus of claim 1, further comprising a biasing member in communication with the frame that urges the frame from the extended position to the stored position.

3. The apparatus of claim 1, wherein the compartment comprises a cup holder.

4. The apparatus of claim 1, wherein the cover member is slidably supported on the frame.

5. The apparatus of claim 1, wherein the frame comprises a free edge portion, and wherein the frame is pivotally mounted within the vehicle compartment such that the frame free edge portion moves away from the panel when the frame is moved to the extended position.

6. The apparatus of claim 1, wherein the frame comprises a free edge portion, and wherein the frame is slidably mounted within the vehicle compartment such that the frame free edge portion moves outwardly from the panel when the frame is moved to the extended position.

7. The apparatus of claim 1, wherein the at least one projection comprises a plurality of projections in adjacent, spaced-apart relationship.

8. The apparatus of claim 1, wherein the frame comprises a free edge portion, and wherein the at least one projection is attached to the free edge portion.

9. The apparatus of claim 1, further comprising a finishing member secured within the vehicle compartment and configured to receive the at least one projection in mating engagement therewith when the frame is in the stored position.

10. The apparatus of claim 1, wherein the at least one projection is movably secured to the frame and is movable from a non-operative position to an operative position, wherein, when in the operative position, the at least one projection is configured to support one or more loaded shopping bags by the handles thereof.

11. An apparatus for supporting loaded shopping bags within a compartment of a vehicle so that the bags are maintained in an upright position, each bag having a pair of handle loops extending upwardly from opposite sides of the bag, wherein the vehicle compartment includes a floor, wherein a panel is in overlying, spaced-apart relationship with the compartment floor, the apparatus comprising:
   a frame having a free edge portion movably secured beneath the panel and movable between a stored position and an extended position, wherein the frame is disposed beneath the panel when in the stored position, wherein the frame extends outwardly from the panel into the vehicle compartment for convenient use thereof by a user when the frame is in the extended position, and wherein the frame comprises a compartment that is configured to receive articles for storage therein;
   a cover member movably supported on the frame and configured to cover the compartment when in a closed position;
   a biasing member in communication with the frame that urges the frame from the extended position to the stored position; and
   a plurality of projections extending from the frame free edge portion in adjacent, spaced-apart relationship, wherein each projection is configured to support one or more loaded shopping bags by the handles thereof and to maintain the one or more loaded shopping bags in an upright position during operation of the vehicle.

12. The apparatus of claim 11, wherein the compartment comprises a cup holder.

13. The apparatus of claim 11, wherein the cover member is slidably supported on the frame.

14. The apparatus of claim 11, wherein the frame is pivotally mounted within the vehicle compartment such that the frame free edge portion moves away from the panel when the frame is moved to the extended position.

15. The apparatus of claim 11, wherein the frame is slidably mounted within the vehicle compartment such that the frame free edge portion moves outwardly from the panel when the frame is moved to the extended position.

16. The apparatus of claim 11, further comprising a finishing member secured within the vehicle compartment and configured to receive the at least one projection in mating engagement therewith when the frame is in the stored position.

17. The apparatus of claim 11, wherein the at least one projection is movably secured to the frame and is movable from a non-operative position to an operative position, wherein, when in the operative position, the at least one projection is configured to support one or more loaded shopping bags by the handles thereof.

18. An apparatus for supporting loaded shopping bags within a trunk of an automobile so that the bags are maintained in an upright position, each bag having a pair of handle loops extending upwardly from opposite sides of the bag, wherein the trunk includes a floor, and wherein a package tray separates the trunk from a passenger compartment of the automobile, wherein the package tray is in overlying, spaced-apart relationship with the trunk floor, the apparatus comprising:

a frame movably secured beneath the package tray and movable between a stored position and an extended position, wherein the frame is disposed beneath the package tray when in the stored position, wherein the frame extends outwardly from the package tray into the trunk for convenient use thereof by a user when the frame is in the extended position, wherein the frame comprises a compartment that is configured to receive articles for storage therein;

a cover member movably supported on the frame and configured to cover the compartment when in a closed position; and at least one projection extending from the frame that is configured to support one or more loaded shopping bags by the handles thereof and to maintain the one or more loaded shopping bags in an upright position during operation of the automobile.

19. The apparatus of claim 18, further comprising a biasing member in communication with the frame that urges the frame from the extended position to the stored position.

20. The apparatus of claim 18, wherein the compartment comprises a cup holder.

21. The apparatus of claim 18, wherein the cover member is slidably supported on the frame.

22. The apparatus of claim 18, wherein the frame comprises a free edge portion, and wherein the frame is pivotally mounted within the trunk such that the frame free edge portion moves downwardly away from the package tray when the frame is moved to the extended position.

23. The apparatus of claim 18, wherein the frame comprises a free edge portion, and wherein the frame is slidably mounted within the trunk such that the frame free edge portion moves outwardly from the package tray when the frame is moved to the extended position.

24. The apparatus of claim 18, wherein the at least one projection comprises a plurality of projections in adjacent, spaced-apart relationship.

25. The apparatus of claim 18, wherein the frame comprises a free edge portion, and wherein the at least one projection is attached to the free edge portion.

26. The apparatus of claim 18, further comprising a finishing member secured within the trunk and configured to receive the at least one projection in mating engagement therewith when the frame is in the stored position.

27. The apparatus of claim 18, wherein the at least one projection is movably secured to the frame and is movable from a non-operative position to an operative position, wherein, when in the operative position, the at least one projection is configured to support one or more loaded shopping bags by the handles thereof.

28. An apparatus for supporting loaded shopping bags within a compartment of a vehicle so that the bags are maintained in an upright position, each bag having a pair of handle loops extending upwardly from opposite sides of the bag, wherein the vehicle compartment includes a floor, wherein a panel is in overlying, spaced-apart relationship with the compartment floor, the apparatus comprising:

a frame movably secured beneath the panel and movable between a stored position and an extended position, wherein the frame is disposed beneath the panel when in the stored position, and wherein the frame extends outwardly from the panel into the vehicle compartment for convenient use thereof by a user when the frame is in the extended position;

at least one projection extending from the frame that is configured to support one or more loaded shopping bags by the handles thereof and to maintain the one or more loaded shopping bags in an upright position during operation of the vehicle; and a finishing member secured within the vehicle compartment and configured to receive the at least one projection in mating engagement therewith when the frame is in the stored position.

29. The apparatus of claim 28, further comprising a biasing member in communication with the frame that urges the frame from the extended position to the stored position.

30. The apparatus of claim 28, wherein the frame further comprises a compartment that is configured to receive articles for storage therein.

31. The apparatus of claim 30, wherein the compartment comprises a cup holder.

32. The apparatus of claim 28, further comprising a cover member movably supported on the frame and configured to cover the compartment when in a closed position.

33. The apparatus of claim 32, wherein the cover member is slidably supported on the frame.

34. The apparatus of claim 28, wherein the frame comprises a free edge portion, and wherein the frame is pivotally mounted within the vehicle compartment such that the frame free edge portion moves away from the panel when the frame is moved to the extended position.

35. The apparatus of claim 28, wherein the frame comprises a free edge portion, and wherein the frame is slidably mounted within the vehicle compartment such that the frame free edge portion moves outwardly from the panel when the frame is moved to the extended position.

36. The apparatus of claim 28, wherein the at least one projection comprises a plurality of projections in adjacent, spaced-apart relationship.

37. The apparatus of claim 28, wherein the frame comprises a free edge portion, and wherein the at least one projection is attached to the free edge portion.

38. The apparatus of claim 28, wherein the at least one projection is movably secured to the frame and is movable from a non-operative position to an operative position, wherein, when in the operative position, the at least one projection is configured to support one or more loaded shopping bags by the handles thereof.

39. An apparatus for supporting loaded shopping bags within a compartment of a vehicle so that the bags are maintained in an upright position, each bag having a pair of handle loops extending upwardly from opposite sides of the bag, wherein the vehicle compartment includes a floor, wherein a panel is in overlying, spaced-apart relationship with the compartment floor, the apparatus comprising:

a frame having a free edge portion pivotally secured beneath the panel and movable between a stored position and an extended position, wherein the frame is disposed beneath the panel when in the stored position, wherein the frame extends outwardly from the panel into the vehicle compartment for convenient use thereof by a user such that the frame free edge portion moves away from the panel when the frame is in the extended position;

a biasing member in communication with the frame that urges the frame from the extended position to the stored position; and a plurality of projections extending from the frame free edge portion in adjacent, spaced-apart relationship, wherein each projection is configured to support one or more loaded shopping bags by the handles thereof and to maintain the one or more loaded shopping bags in an upright position during operation of the vehicle.

40. The apparatus of claim 39, wherein the frame further comprises a compartment that is configured to receive articles for storage therein.

41. The apparatus of claim 40, wherein the compartment comprises a cup holder.

42. The apparatus of claim 40, further comprising a cover member movably supported on the frame and configured to cover the compartment when in a closed position.

43. The apparatus of claim 42, wherein the cover member is slidably supported on the frame.

44. The apparatus of claim 39, wherein the frame is slidably mounted within the vehicle compartment such that the frame free edge portion moves outwardly from the panel when the frame is moved to the extended position.

45. The apparatus of claim 39, further comprising a finishing member secured within the vehicle compartment and configured to receive the at least one projection in mating engagement therewith when the frame is in the stored position.

46. The apparatus of claim 39, wherein the at least one projection is movably secured to the frame and is movable from a non-operative position to an operative position, wherein, when in the operative position, the at least one projection is configured to support one or more loaded shopping bags by the handles thereof.

47. An apparatus for supporting loaded shopping bags within a compartment of a vehicle so that the bags are maintained in an upright position, each bag having a pair of handle loops extending upwardly from opposite sides of the bag, wherein the vehicle compartment includes a floor, wherein a panel is in overlying, spaced-apart relationship with the compartment floor, the apparatus comprising:
- a frame having a free edge portion movably secured beneath the panel and movable between a stored position and an extended position, wherein the frame is disposed beneath the panel when in the stored position, and wherein the frame extends outwardly from the panel into the vehicle compartment for convenient use thereof by a user when the frame is in the extended position;
- a biasing member in communication with the frame that urges the frame from the extended position to the stored position;
- a plurality of projections extending from the frame free edge portion in adjacent, spaced-apart relationship, wherein each projection is configured to support one or more loaded shopping bags by the handles thereof and to maintain the one or more loaded shopping bags in an upright position during operation of the vehicle; and
- a finishing member secured within the vehicle compartment and configured to receive the at least one projection in mating engagement therewith when the frame is in the stored position.

48. The apparatus of claim 47, wherein the frame further comprises a compartment that is configured to receive articles for storage therein.

49. The apparatus of claim 48, wherein the compartment comprises a cup holder.

50. The apparatus of claim 48, further comprising a cover member movably supported on the frame and configured to cover the compartment when in a closed position.

51. The apparatus of claim 50, wherein the cover member is slidably supported on the frame.

52. The apparatus of claim 47, wherein the frame is pivotally mounted within the vehicle compartment such that the frame free edge portion moves away from the panel when the frame is moved to the extended position.

53. The apparatus of claim 47, wherein the frame is slidably mounted within the vehicle compartment such that the frame free edge portion moves outwardly from the panel when the frame is moved to the extended position.

54. The apparatus of claim 47, wherein the at least one projection is movably secured to the frame and is movable from a non-operative position to an operative position, wherein, when in the operative position, the at least one projection is configured to support one or more loaded shopping bags by the handles thereof.

55. An apparatus for supporting loaded shopping bags within a trunk of an automobile so that the bags are maintained in an upright position, each bag having a pair of handle loops extending upwardly from opposite sides of the bag, wherein the trunk includes a floor, and wherein a package tray separates the trunk from a passenger compartment of the automobile, wherein the package tray is in overlying, spaced-apart relationship with the trunk floor, the apparatus comprising:
- a frame movably secured beneath the package tray and movable between a stored position and an extended position, wherein the frame is disposed beneath the package tray when in the stored position, and wherein the frame extends outwardly from the package tray into the trunk for convenient use thereof by a user when the frame is in the extended position;
- at least one projection extending from the frame that is configured to support one or more loaded shopping bags by the handles thereof and to maintain the one or more loaded shopping bags in an upright position during operation of the automobile; and
- a finishing member secured within the trunk and configured to receive the at least one projection in mating engagement therewith when the frame is in the stored position.

56. The apparatus of claim 55, further comprising a biasing member in communication with the frame that urges the frame from the extended position to the stored position.

57. The apparatus of claim 55, wherein the frame further comprises a compartment that is configured to receive articles for storage therein.

58. The apparatus of claim 57, wherein the compartment comprises a cup holder.

59. The apparatus of claim 57, further comprising a cover member movably supported on the frame and configured to cover the compartment when in a closed position.

60. The apparatus of claim 59, wherein the cover member is slidably supported on the frame.

61. The apparatus of claim 55, wherein the frame comprises a free edge portion, and wherein the frame is pivotally mounted within the trunk such that the frame free edge portion moves downwardly away from the package tray when the frame is moved to the extended position.

62. The apparatus of claim 55, wherein the frame comprises a free edge portion, and wherein the frame is slidably mounted within the trunk such that the frame free edge portion moves outwardly from the package tray when the frame is moved to the extended position.

63. The apparatus of claim 55, wherein the at least one projection comprises a plurality of projections in adjacent, spaced-apart relationship.

64. The apparatus of claim 55, wherein the frame comprises a free edge portion, and wherein the at least one projection is attached to the free edge portion.

65. The apparatus of claim 55, wherein the at least one projection is movably secured to the frame and is movable from a non-operative position to an operative position, wherein, when in the operative position, the at least one projection is configured to support one or more loaded shopping bags by the handles thereof.

* * * * *

UNITED STATES PATENT AND TRADEMARK OFFICE
CERTIFICATE OF CORRECTION

PATENT NO. : 6,502,731 B1 Page 1 of 1
DATED : January 7, 2003
INVENTOR(S) : Gehring et al.

It is certified that error appears in the above-identified patent and that said Letters Patent is hereby corrected as shown below:

Column 8,
Line 14, should read -- 32. The apparatus of claim 30, further comprising a cover --

Signed and Sealed this

Ninth Day of December, 2003

JAMES E. ROGAN
*Director of the United States Patent and Trademark Office*